(12) United States Patent
Liu (10) Patent No.: US 7,417,747 B2
(45) Date of Patent: Aug. 26, 2008

(54) METHOD AND A DEVICE FOR MEASURING THE THREE DIMENSION SURFACE SHAPE BY PROJECTING MOIRE INTERFERENCE FRINGE

(76) Inventor: Lang Liu, #18 Yucai Xiang, Shenyang, Liaoning 110042 (CN)

( * ) Notice: Subject to any disclaimer, the term of this patent is extended or adjusted under 35 U.S.C. 154(b) by 320 days.

(21) Appl. No.: 10/500,697

(22) PCT Filed: Dec. 31, 2001

(86) PCT No.: PCT/CN01/01655

§ 371 (c)(1), (2), (4) Date: Aug. 18, 2005

(87) PCT Pub. No.: WO03/064972

PCT Pub. Date: Aug. 7, 2003

(65) Prior Publication Data

US 2006/0232788 A1 Oct. 19, 2006

(51) Int. Cl.
*G01B 11/24* (2006.01)

(52) U.S. Cl. .................................................... 356/605

(58) Field of Classification Search ......... 356/601–623; 250/237 G

See application file for complete search history.

(56) References Cited

U.S. PATENT DOCUMENTS

| 4,758,093 A | * | 7/1988 | Stern et al. | 356/608 |
|---|---|---|---|---|
| 5,118,192 A | * | 6/1992 | Chen et al. | 356/602 |
| 5,396,331 A | * | 3/1995 | Kitoh et al. | 356/611 |
| 5,570,187 A | * | 10/1996 | Nihei et al. | 356/608 |
| 6,084,712 A | * | 7/2000 | Harding | 359/618 |
| 2005/0174581 A1 | * | 8/2005 | Liu | 356/602 |
| 2006/0232788 A1 | * | 10/2006 | Liu | 356/605 |

* cited by examiner

*Primary Examiner*—Hoa Q Pham
(74) *Attorney, Agent, or Firm*—Thomas I. Rozsa (57) ABSTRACT

A method and apparatus for measuring contour of a full fielded 3D surface of an object. The apparatus includes a projection device having a mark point and master grating, an imaging device for imaging imaged grating and mark point which are positioned on the object surface, and two rectilinearly movable axles. The method includes steps of: measuring a projected object and image distances, and an imaged object and image distances; determining a position of the zero order phase of the fringe according to an imaged mark point on the object surface; calculating orders of the moire fringes for the full fielded 3D surface of the object based on a phase-shift and unwrapping algorithms; and finally calculating an absolute contour of 3D object surface according to a relationship between altitudes of surface points of the object and the moire fringes referencing to a point of the object surface which is derived as a reference point of 3D coordinates.

24 Claims, 8 Drawing Sheets

METHOD AND A DEVICE FOR MEASURING THE THREE DIMENSION SURFACE SHAPE BY PROJECTING MOIRE INTERFERENCE FRINGE

BACKGROUND OF THE INVENTION

1. Field of the Invention

The present invention is related to a method and apparatus for three dimensional (3D) surface measurement, and more particularly related to a method and apparatus for analyzing absolute contour of full fielded 3D surface of objects applying a projected moire fringe interferometry.

2. Description of the Prior Art

Measuring contour of three dimensional surface of objects attracts attention in the society of engineering and technology. The currently available commercial apparatus for 3D surface measurement includes a type of instrument for measuring three-coordinate data of objects which is relied on mechanically contacting each point of the object surface, and another type of laser instrument of measuring three-coordinate data of objects. The instrument for the contacting measurement is equipped with a mechanical probe. The probe which is driven by a numerical control mechanism travels on the surface of an object under measurement to thereby provide the three-coordinate data for every point of the object surface. Accuracy of the spatial measurement is generally better than 0.01 mm for the instrument. However, a measuring speed of the instrument is relatively slow, since it takes times for the numerical system to move across the surface while the mechanical probe applies forces at certain extent to the object.

In stead of applying the mechanical probe, the laser instrument employs an optical probe which is driven by a numerical control system. An optical spot generated by the optical probe scans surface of an object. In general, the laser instrument improves the measuring speed while suffering a loss of some degree of the accuracy in the spatial measurement. However, increase of the measuring speed for the laser instrument is still limited by the moving speed of the numerical control system. Therefore, a full field measurement of the object will be optimum if it can largely increase the measuring speed.

A moire image including moire fringes is obtained from applying a projected moire interferometry. The fringes are produced from interfering an optical image of a master grating, when the image is optically positioned on a submaster grating. The projected moire interferometry is a full field non-contacting technique for measurement of characteristics of the object surface, which possesses a plurality of measuring capabilities as compared with a holographic interferometry. However, it is more important that, the projected moire interferometry enables controlling its sensitivity in measurement so that the moire interferometry is excellent to reject external interference. For this reason, there is a great prospect of utilizing the projected moire interferometry in engineering applications.

A moire contouring is a promising optical method for imaging object surface, which is originally introduced by Takasaki and Meadows et. al. An apparatus which applies the method is actually quite simple, including a grating which is positioned adjacent an object so that shadow fringes can be observed on the object after projecting lights through the grating. The shadow fringes are equivalent to lines of the moire contouring under certain conditions, which can be used to measure surface characteristics of objects. The method is particularly useful to measure objects having small sizes since the grating size limits application of the apparatus only to the small objects.

Another method of the moire contouring is respectively introduced by Benoit, P.; Yoshino, Y.; Suzuki, M. and others. The method includes projecting an image of grooves of a master grating onto the surface of an object to thereby image a graph of the moire contour of the object through a submaster grating. The method is referred to the projected moire interferometry, which is particularly useful to measure objects having large sizes. Under certain conditions, beat fringes generated from a combining effect of the master grating and submaster grating provide lines of a contour map of the imaged object surface, which is analogous to the way a topographic map delineates the contour of the land. In the early 1980s, image processing was successfully introduced for analyzing the moire fringes. Core technologies of the image processing particularly include a phase shift algorithm and unwrapping algorithm, which makes the projected moire fringe interferometry enable to perform a real-time measurement.

According to studies of Meadows, Takasak and Suzuki et. al, the moire fringes become the respective lines of the surface contour map for an object if following criteria are met: optical centers of the respective projection and imagining optical axe are in parallel; spaces of the respective projecting master grating and imaging submaster grating are the same; focal lengths of the respective projection lens and imaging lens are the same; and distance between the projection grating and lens is the same as compared with distance between the imaging grating and lens.

Figure 1:
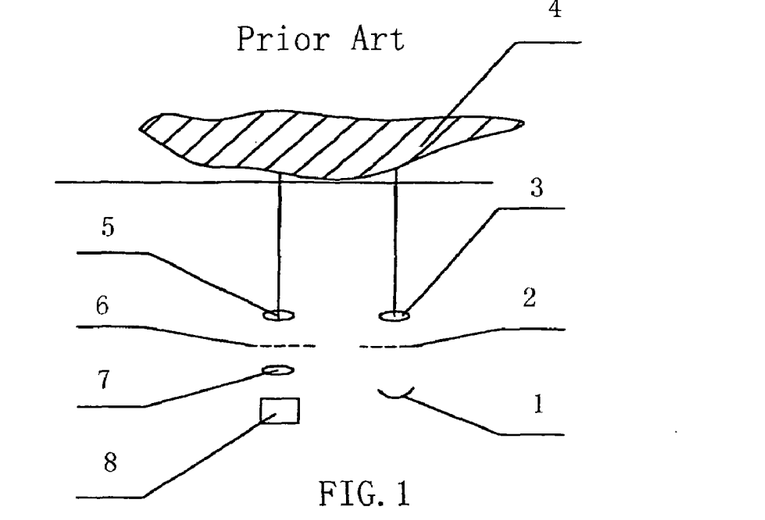
FIG. 1 is a schematic diagram of main structural elements for a prior art of the moire interferometry.

Referring to FIG. 1, there is illustrated a prior art moire interferometer, wherein a light source 1 projects light rays which pass through a projection master grating 2, so that an image of grooves of the master grating is focused on an object 4 under measurement after the lights optically pass through a projection lens 3. An image of the measured object is then positioned on a submaster grating 6 in addition to moire fringes which are also formed. Images of the formed moire fringes are then optically recorded by a camera 8 through a camera lens 7.

However, there are two unresolved problems which have persistently associated with the projected moire interferometry long time ago. The first one is that contour lines of the contour map for the object surface, which are described by the moire fringes, are function of orders of the fringes. Therefore, differences in attitude are not equal for respective two adjacent contour lines of the map. In fact, the attitude difference is also a function of the fringe order. Therefore, it is necessary to accurately determine the absolute orders of the moire fringes if absolute appearance of the 3D object surface is desired. The second problem is a necessity of accurately measuring object distances between the respective projection device to the object, and the imaging device to the object, and imaging distances between the respective projection grating to the object, and the image grating to the object. The currently available projected moire interferometer is unable to accurately measure the above mentioned distances. In stead, it is from a rough measurement to estimate the object distances and image distances, according to an assumption that the attitude differences between the respective two adjacent contour lines are constant.

SUMMARY OF THE INVENTION

Purpose of the Invention

It is therefore an objective of the present invention to provide a method and apparatus from an improved projected moire fringe interferometry which overcomes the problems of the currently available techniques for measuring surface contour. The present invention method and apparatus can measure the absolute contour of the object surface with high accuracies in combination with advantage of the real-time analysis from the prior projected moire interferometry.

Contents of the Invention

The techniques which are applied to realize the objective of the present invention include an apparatus for measuring contour of the 3D surface of objects. The apparatus is comprised of a projection device including a mark point and master grating, an imaging device including a mark point and submaster grating, and a first and second rectilinearly movable axles aligning with the respective x and y axe of the x-y coordinate system. Application of the rectilinearly movable coordinate axles can construct a right angled triangle from using the mark point of the projection device, the mark point of the imaging device, and an image of the mark point of the projection device which is projected to an exterior surface of the object, wherein they are at an arbitrary positions where an image of the object can be formed.

The first rectilinearly movable axle having a first grating ruler is aligned with an optical axis of the imaging device, which is positioned perpendicular to the second rectilinearly movable axle having a second grating ruler. In addition, an optical axis of the projection device intersects the second rectilinearly movable axle at an angle $\gamma$. The optical axe of the respective projection device and imaging device intersects each other at an angle $\theta$, wherein the angles $\gamma$ and $\theta$ are complementary.

The present invention of the measurement apparatus also includes an image capture board to digitize image signals and a computer to process the digitized images.

The projection device from the present invention includes a light source, a master grating, a mark point, and a movable projection lens, wherein the mark point can be positioned behind the master grating, or in parallel with the master grating.

The imaging device from the present invention includes a light path for measuring purpose, wherein optical components which are positioned within the light path include a camera, a submaster grating, a mark point which can be switched in and off the light path, and a movable imaging lens, wherein the mark point is positioned in parallel with the submaster grating.

In addition, the imaging device form the present invention can also have another preferred embodiment including a light path for image in addition to the light path for measurement. The light path for measurement has optical components including a camera, submaster grating, and a movable imaging lens. The light path for image includes a camera which records an image of a mark point, a reflection mirror which reflects an incident light at an angle of 90 degrees, the mark point, and a square prism which is positioned between the imaging lens and the submaster grating, wherein the prism can split an incident light to two emerging lights, which one emerging light travels along a direction with 90 degrees to another emerging light aligning with the incident light.

The disclosed master and submaster gratings of the respective projection and imaging devices from the present invention can be a type of the Ronchi grating or sinusoidal grating. The mark points have the shape of a circle or cross.

The light which is employed in the present invention includes a white light.

The illustrated movable projection lens which is positioned inside of the projection device includes a linear positioner which can move the lens. Similarly, the illustrated movable imaging lens which is positioned inside of the imaging device includes a linear positioner for moving the lens.

The present invention includes the method of measuring contour of the 3D object surface, wherein the method is comprised of the stops of:

(1) establishing a right angled triangle from connecting the mark point of the projection device, the mark point of the imaging device, and the image of the mark point of the projection device which is projected onto the object surface;

(2) determining a conjugated projecting distance, and a conjugated imaging distance;

(3) calculating a projected object and image distances, and imaged object and image distances;

(4) focusing automatically of the respective projection lens and imaging lens in accordance with the calculated projected object and image distances, and the calculated imaged object and image distances to form the moire fringes on the submaster grating of the imaging device;

(5) calculating a phase distribution through the object surface from applying the phase-shift algorithm and unwrapping algorithm in reference of a zero order of the phase which is defined as the image of the mark point which is projected on the object; and (6) calculating a height distribution.

Accordingly, the present invention method includes: first establishing the right angled triangle from applying the mark point of the projection device, mark point of the imaging device, and the image of the mark point of the projection device which is projected onto the object surface; measuring the respective projected object and image distances, and the respective imaged object and image distances at a position where an image is formed, wherein the measurement is conducted from using the mark points of the respective projection and imaging devices, and the rectilinearly movable axles which are aligned with the respective x and y coordinate axe; then determining the position of a moire fringe having the zero-order phase according to the image of the mark point of the projection device, which is projected on the surface of the object; deciding orders of the moire fringes positioned in a full field of the object surface from applying the phase-shift algorithm and unwrapping algorithm; and finally calculating an accurate contour of the object 3D surface according to relationships of altitudes of the object surface points and the moire fringes in reference of a point of the object surface which serves as a reference point of the coordinates.

The right angled triangle as illustrated above is established through the following steps: moving the object into a viewable field of the imaging device; focusing an image of the mark point which is projected on the object surface; and aligning the image of the mark point on the object surface with the mark point of the imaging device.

Figure 5:
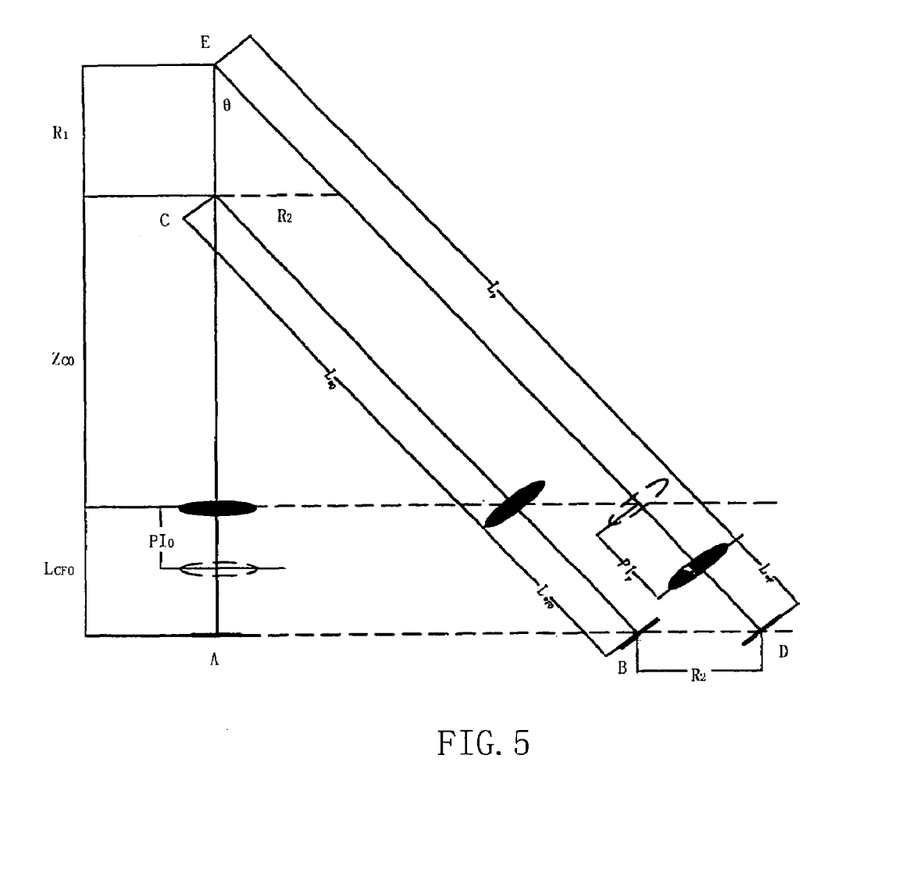
FIG. 5 is a schematic diagram, which illustrates relationship of calculated parameters from the present invention.

The conjugated projection and imaging distances, which are illustrated above, are determined from the following steps: calculating lengths of the respective two sides of a right angled triangle $\triangle ADE$ from applying a known length of the rest one side and a known degree of an angle of the triangle, where $AE=AD/tg\,\theta$; $DE=AD/\sin\theta$. The angle $\theta$ is between the optical axe of the respective projection and imaging devices, which can be calculated from: $\theta=\arctg\,R_2/R_1$. AD is a distance between the projection and imaging device, which is measured from a reading of the second grating ruler (a length of the second rectilinearly movable axle which forms one side of the right angled triangle ΔADE), $R_1$ and $R_2$ are moved distances of the respective master and submaster gratings, AE is an imaged conjugated distance between the object and submaster grating of the imaging device, and DE is a projected conjugated distance between the master grating of the projection device and the object.

Therefore, the projected object and image distances, and the imaged object and image distances can be calculated according the following respective equations:

$$Z_C + Z_{CF} = \frac{AD}{tg\vartheta}$$

$$\frac{1}{Z_C} + \frac{1}{Z_{CF}} = \frac{1}{F_1}$$

$$L_P + L_{PF} = \frac{AD}{\sin\vartheta}$$

$$\frac{1}{L_P} + \frac{1}{L_{PF}} = \frac{1}{F_2}$$

where, $Z_C$ is the imaged object distance, $Z_{CF}$ is the imaged image distance, $L_{PF}$ is the projected image distance, $L_P$ is the projected object distance, $F_1$ is the focal length of the imaging device, and $F_2$ is the focal length of the projection device.

The present invention enables to construct the moire fringes which are positioned on the submaster grating of the imaging device from the step of automatically focusing. The operation of the automatically focusing moves the projection lens and imaging lens to the respective positions so that the moire fringes are formed, wherein the movement is conducted according to the calculated data including the projected object and image distances, and the imaged object and image distances.

Finally, the present invention enables to calculate the height distribution according to the following equations:

$$Z = -\frac{\left(\frac{\varphi}{2\pi f} + X_C\right)D - L_{PF}B}{\left(\frac{\varphi}{2\pi f} + X_C\right)C - L_{PF}A}$$

$$X_Z = \frac{Z + Z_C}{Z_{CF}} X_C$$

$$Y_Z = \frac{Z + Z_C}{Z_{CF}} Y_C$$

where $X_Z$, $Y_Z$, and $Z$ are the respective coordinates for a point of the object surface which is spatially positioned, f is a grating frequency, and $\varphi$ is a phase.

$A = Z_C Z_{CF} \sin\theta + Z_C X_C \cos\theta \quad B = Z_C^2 X_C \cos\theta$ $C = Z_C Z_{CF} \cos\theta - Z_C X_C \sin\theta \quad D = -Z_C^2 X_C \sin\theta + Z_C Z_{CF} L_P$ The following is a detailed disclosure of the present invention apparatus and method taken in conjunction with the drawings and examples. However, referring particularly to the examples is for the purpose of illustration only and not limitation of the present invention.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 2:
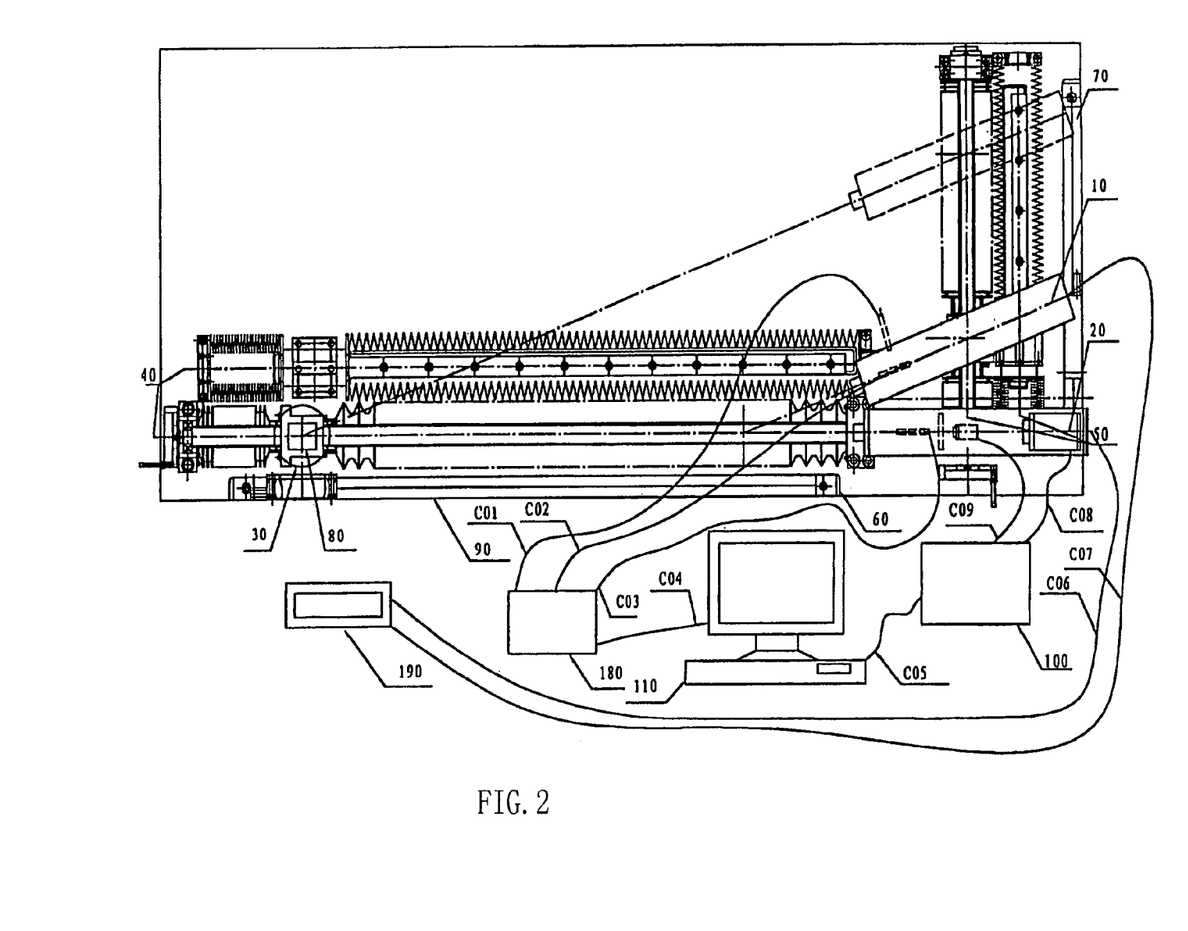
FIG. 2 is a diagrammatic representation of the present invention apparatus for measuring contour of a full field three dimensional surface of an object by applying the moire fringes.

Referring to FIG. 2, there is illustrated structural components of the present invention apparatus for measuring contour of a full field three dimensional surface of an object by applying projected moire fringe interferometry. The apparatus is comprised of an imaging device 20, a first rectilinearly movable axle 40 and a first grating ruler 60 which are positioned to align with an optical axis of the imaging device 20, and an object 80 positioned on a rotating objective receiving support 30 which is rotatably affixed to a movable plate 41, wherein the movable plate 41 is slidably connected to the first rectilinearly movable axle 40.

The apparatus further includes a second rectilinearly movable axle 50 and a second grating ruler 70 which are positioned to perpendicular to the first rectilinearly movable axle 40, a projection device 10 which is positioned on the second rectilinearly movable axle 50 and whose optical axis intersects the axle 50 at an angle γ, and a marble platform 90 which affixes including the first rectilinearly movable axle 40 and the first grating ruler 60, the second rectilinearly movable axle 50 and the second grating ruler 70, and the imaging device 20. In addition, the present invention apparatus additionally includes an image capture board 100 which is used to digitize image signals, and a computer 110 for processing the digitized image signals.

Figure 3:
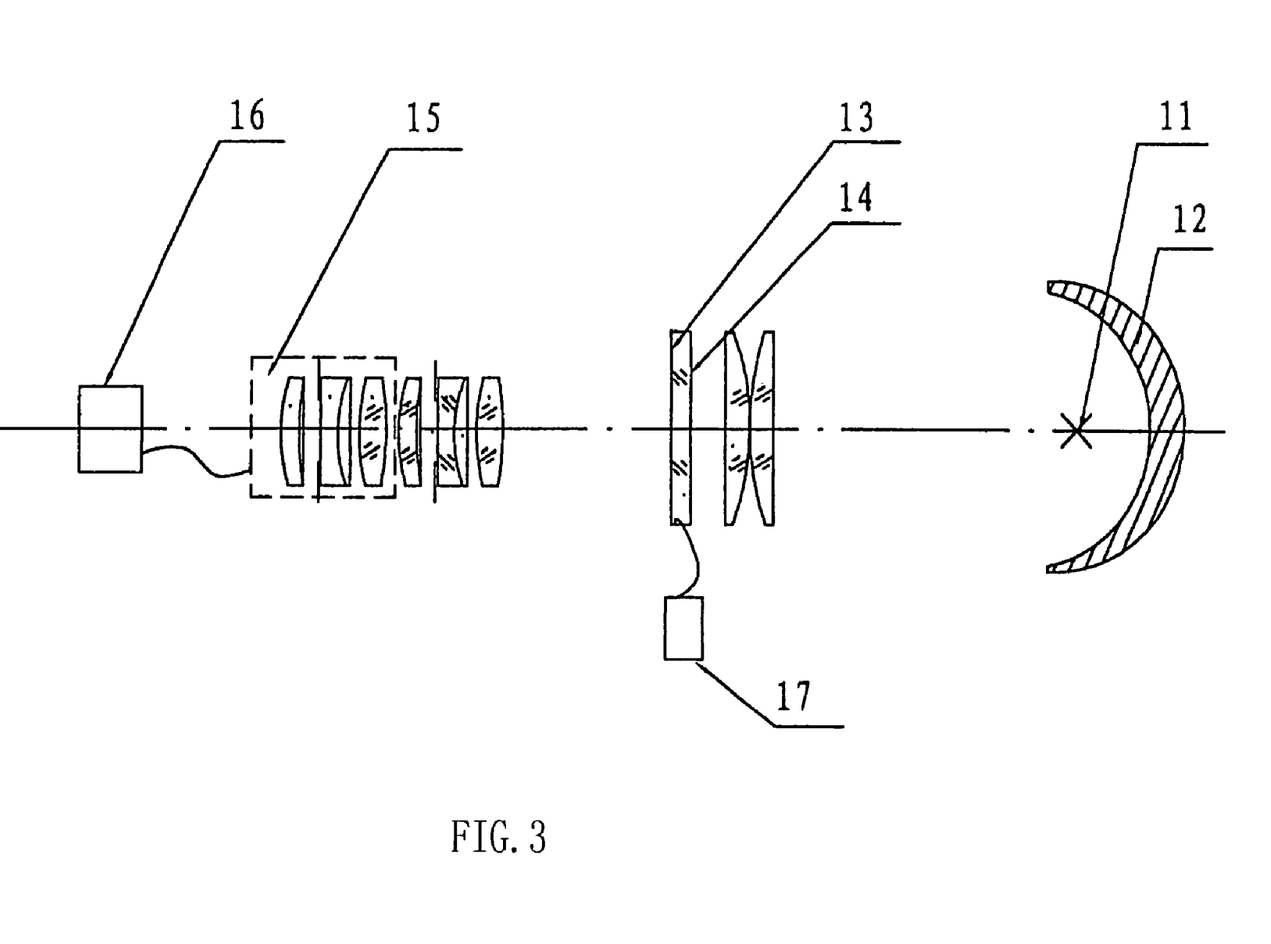
FIG. 3 is a schematic diagram which illustrates optical components for a preferred embodiment of a projection device of the present invention apparatus.

As illustrated in FIG. 3, the projection device 10 is comprised of optical components including a light source 11 which is positioned in front of a condenser 12, a master grating 13 whose grooves are positioned on one surface of the grating, a mark point 14 which is positioned on the opposite surface of the grating, and a projection lens 15. The master grating 13 is movable aligning with an orientation of the grating surface, wherein the movement of the grating 13 is controlled by a linear positioner 17. Similarly, the projection lens 15 is movable aligning with an optical axis of the projection device, wherein the movement of the lens 15 is controlled by a linear positioner 16.

Figure 8:
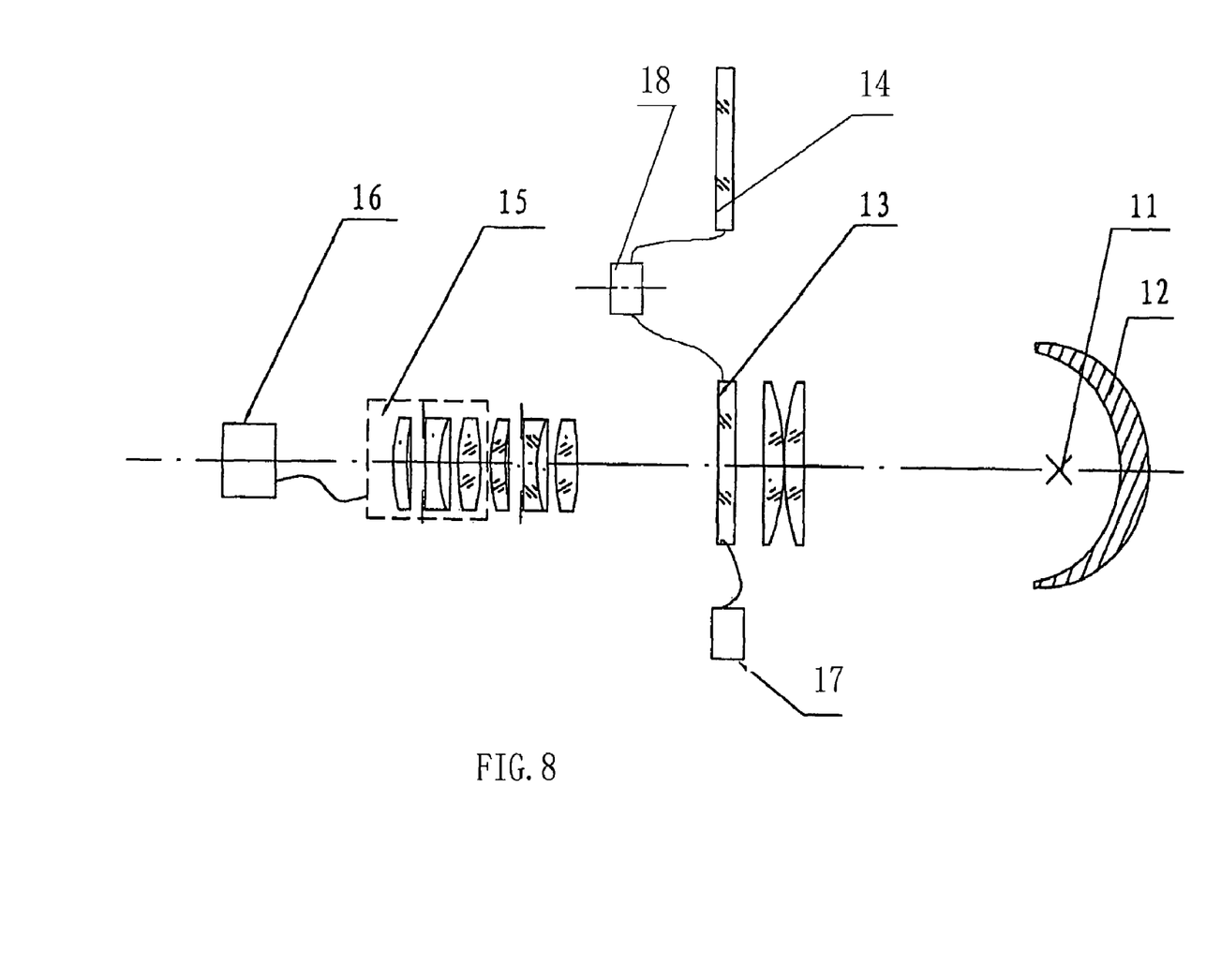
FIG. 8 is a schematic diagram which illustrates optical components from another embodiment of the projection device of the present invention apparatus.

It will be appreciated that, as illustrated the projection device 10 in FIG. 8, the mark point 14 can be positioned in parallel with the grooves of the master grating 13.

The imaging device 20 is comprised of a measuring light path, which includes a camera 21, a switcher 27 for switching a mark point 25 positioned and the submaster grating 23, and a movable imaging lens 29

Figure 9:
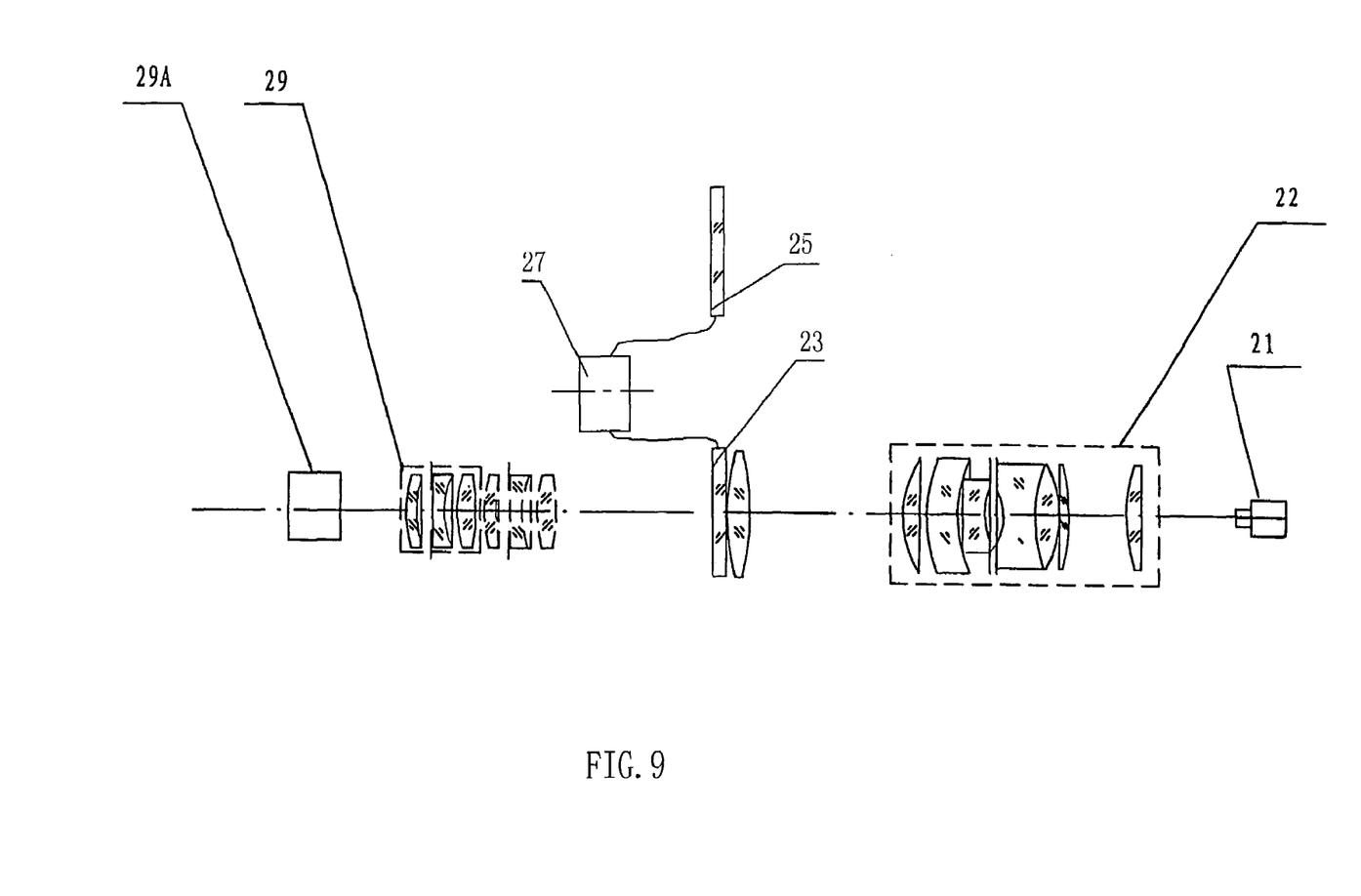
FIG. 9 is a schematic diagram which illustrates optical components from another embodiment of the imaging device of the present invention apparatus.

Referring to FIG. 9, the measuring light path includes a camera 21 having a camera lens 22 which records images of the moire fringes positioned on the submaster grating, the switcher 27 which can switch the mark point 25 and the submaster grating 23 respectively in or off the optical axis of the imaging device, and the movable imaging lens 29 whose movement aligning with the optical axis is controlled by a linear positioner 29A.

Figure 4:
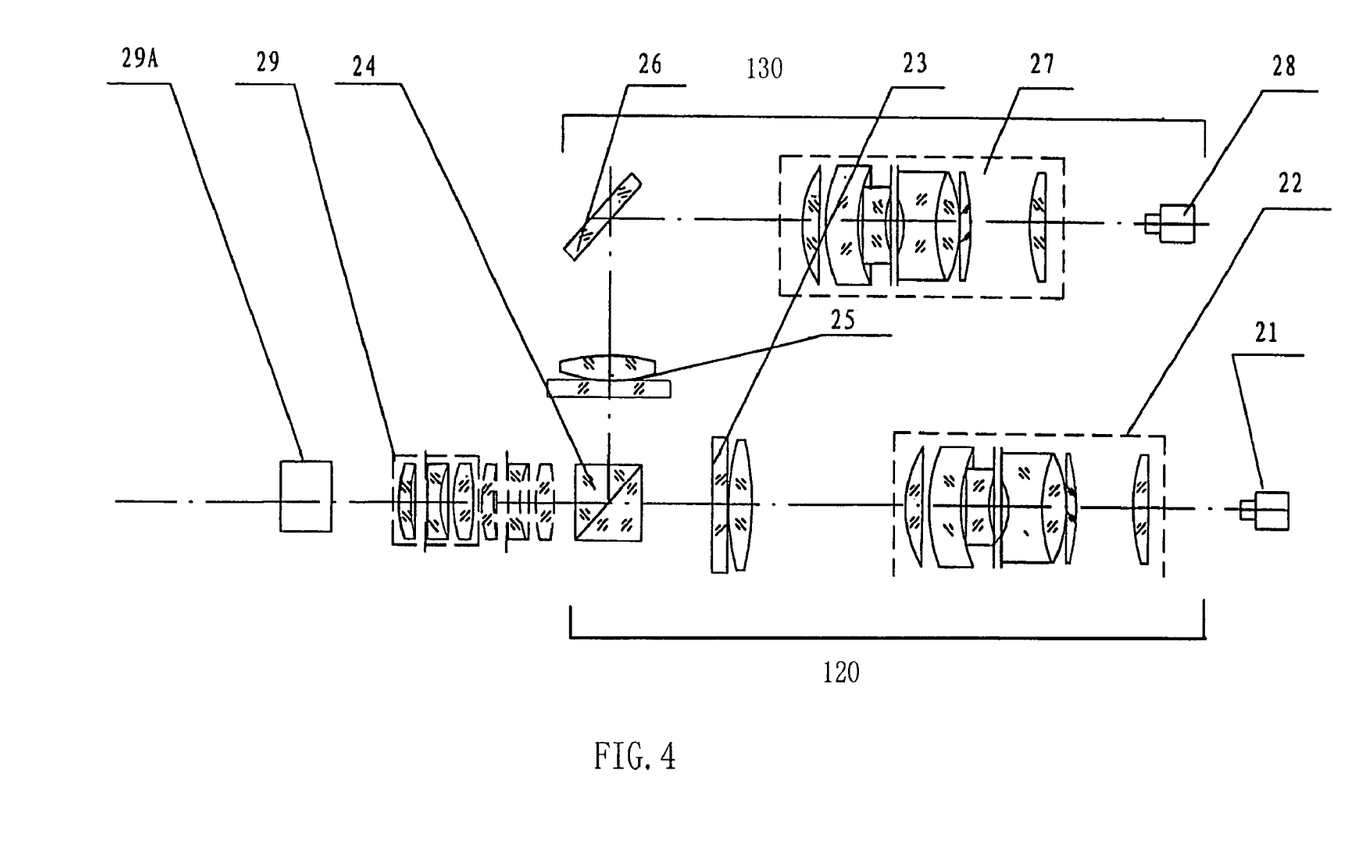
FIG. 4 is a schematic diagram which illustrates optical components for a preferred embodiment of an imaging device from the present invention apparatus.

It will be appreciated that, as illustrated in FIG. 4, the imaging device 20 includes an alternative embodiment comprising a measuring light path 120 and imaging light path 130. The imaging optical path 130 includes the movable imaging lens 29, the linear positioner 29A which controls the movement of the movable imaging lens 29 aligning with an optical axis of the lens 29, a square prism 24 which is positioned between the image lens 29 and submaster grating 23 for splitting an incident light into a first and second emerging lights, wherein the first emerging light is aligned with the incident light and the second emerging light is departing from the first emerging light at an angle of 90 degrees, a mark point 25 which is positioned between the square prism 24 and a reflection mirror 26, wherein the mirror 26 reflects the second emerging light at an angle of 90 degrees, an imaging camera 28 having a camera lens 27 for recording the imaged mark point 25. The measuring optical path 120 includes the movable image lens 29, the linear positioner 29A which controls movement of the lens 29 along its optical axis, the measuring camera 21 having the camera lens 22 for receiving images of the moire fringes positioned on the submaster grating 23.

Figure 7:
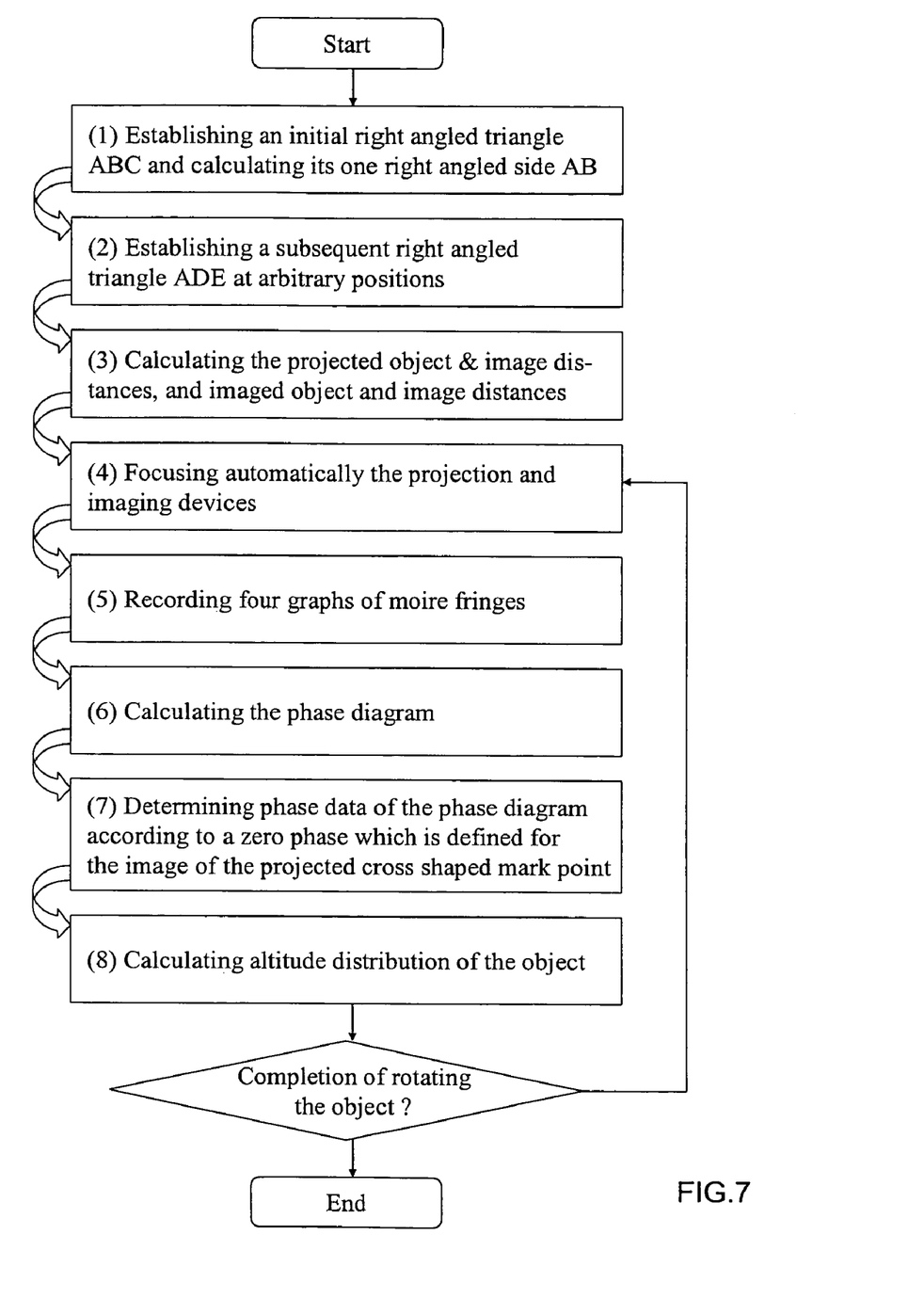
FIG. 7 is a flow chart which illustrates steps of the present invention method for measuring contour of a full field three dimensional surface of an object by applying the moire fringes.

Referring now to FIG. 7, there is illustrated a flow chart of the present invention method to measure contour of a full field 3D surface of an object. During the measurement, first move the measured object 80 along the first rectilinearly movable axle 40 to a position mostly adjacent the imaging device 20. Then focus the projection lens of the projection device 10 to thereby form a clear image of the mark point of the projection device onto the surface of the measured object 80. Focus the imaging lens of the image device 20 to thereby form a clear image of the object 80 including the imaged mark point on the object. Additionally move the projection device 10 along the second rectilinearly movable axle 50 to thereby superpose the image of the imaged mark point which is projected onto the object surface upon the mark point of the imaging device 20. In this setting, a triangle $\triangle ABC$ as illustrated in FIG. 5 is formed by connecting the mark point of the projection device, the mark point of the imaging device, and the image of the mark point of the projection device on the object surface. In addition, the triangle $\triangle ABC$ is a right angled one, since the first rectilinearly movable axle 40 crosses the second rectilinearly movable axle 50, and a line AB which connects the mark point of the projection device to the mark point of the imaging device is aligned with the moving direction of the second rectilinearly movable axle 50. Therefore, the first step includes measuring a length of the right-angled side AB, and an angle θ when the optical axis of the projection device 10 intersects the optical axis of the imaging device 20.

Then reset the first and second grating ruler 60 and 70 to a respective zero reading. Move the object 80 to a position E along the first rectilinearly movable axle 40, which results in a reading of a moved distance as $R_1$ on the first grating ruler 60. Move the projection device 10 to a position D along the second rectilinearly movable axle 50, which results in a reading of a moved distance as $R_2$ on the second grating ruler 70. In this setting, a new right angled triangle $\triangle ADE$ is constructed from connecting the mark point 15 of the projection device, the mark point 25 of the imaging device, and the reference point E on the object. If defining a focal length of the movable imaging lens 29 as $F_1$, an imaged object distance as $Z_C$, an imaged image distance as $Z_{CF}$, a focal length of the movable projection lens 15 as $F_2$, a projected object distance as $L_P$, and a projected image distance $L_{PF}$, then the following equations can be given:

$$AD = AB + R_2 \quad (1)$$

$$\frac{1}{Z_C} + \frac{1}{Z_{CF}} = \frac{1}{F_1} \quad (2)$$

$$Z_C + Z_{CF} = \frac{AD}{tg\theta} \quad (3)$$

$$L_P + L_{PF} = \frac{AD}{\sin\theta} \quad (4)$$

$$\frac{1}{L_P} + \frac{1}{L_{PF}} = \frac{1}{F_2} \quad (5)$$

Therefore, determine values of the respective $Z_C$ and $Z_{CF}$ according to Equations (2) and (3), and calculate values of the respective $L_P$ and $L_{PF}$ according to Equations (4) and (5). Then perform automatically focusing operation for the movable projection lens and image lens.

The automatically focusing operation includes moving the movable projection lens 15 of the projection device 10 to a position which correlates to the projected image distance $L_{PF}$. This movement results in forming a clear image of grooves of the master grating onto the object surface after light rays radiated from the light source pass through the master grating to the object. Then move the imaging lens of the imaging device to a position which correlates to the imaged image distance $Z_{CF}$. The movement results in forming interference fringes on the submaster grating 23, which are the moire fringes, in addition to an image of the object surface having the groove image of the master grating which is projected onto the object surface.

Then, the moire fringes are recorded by the imaging camera, which are further transferred to the image capture board 100 for digitization. The digitized images of the moire fringes are further processed in the computer 110 so that a first graph of the digitized more fringes can be obtained.

For obtaining additional three graphs of the moire fringes, move the master grating of the projection device in the direction which is vertical to the optical axis of the projection device according to a moving distance of a respective quarter, half and three-quarter grating space. Therefore, a total of four graphs of the moire fringes can be obtained, which are then recorded by the camera. The graphs are further input into the computer 110 through the image capture board 100. Then apply the phase-shift algorithm to obtain a phase diagram in the phase ranging from 0 to $2\pi$. The algorithm includes the following equations:

$$I_1 = I_0 + A\sin(\varphi + 0) \qquad (6)$$

$$I_2 = I_0 + A\sin\left(\varphi + \pi\frac{1}{2}\right) \qquad (7)$$

$$I_3 = I_0 + A\sin(\varphi + \pi) \qquad (8)$$

$$I_4 = I_0 + A\sin\left(\varphi + \frac{3\pi}{2}\right) \qquad (9)$$

$$\varphi = tg^{-1}\frac{I_4 - I_2}{I_1 - I_3} \qquad (10)$$

where $I_0$ is an intensity of the background lights, A is a contrast of the fringes; and $\omega$ is a phase of the measured point.

Then, calculate the phase data of the phase diagram applying the unwrapping algorithm having principles as:

$\phi_2 = \phi_1 - 2\pi$ if $\phi_2 - \phi_1 \geq \pi$, and $\phi_2 = \phi_1 + 2\pi$ if $\phi_2 - \phi_1 \leq -\pi$ This forms a continuously phase distribution.

The next step of the present invention method is to calculate a high distribution of the object from applying the respective derived projected moire heights and the phase equations in accordance with the following parameters which are known: the imaged object distance $Z_C$, imaged image distance $Z_{CF}$, projected image distance, projected object distance $L_P$, intersected angle $\theta$ between the optical axe of the respective projection and imaging devices, and the grating space $P_P = P_C = P$.

In addition, the equations are versatile, which correlates a random triangle established from connecting centers of the respective master and submaster gratings to the image of the master grating which is projected on the object surface.

Figure 6:
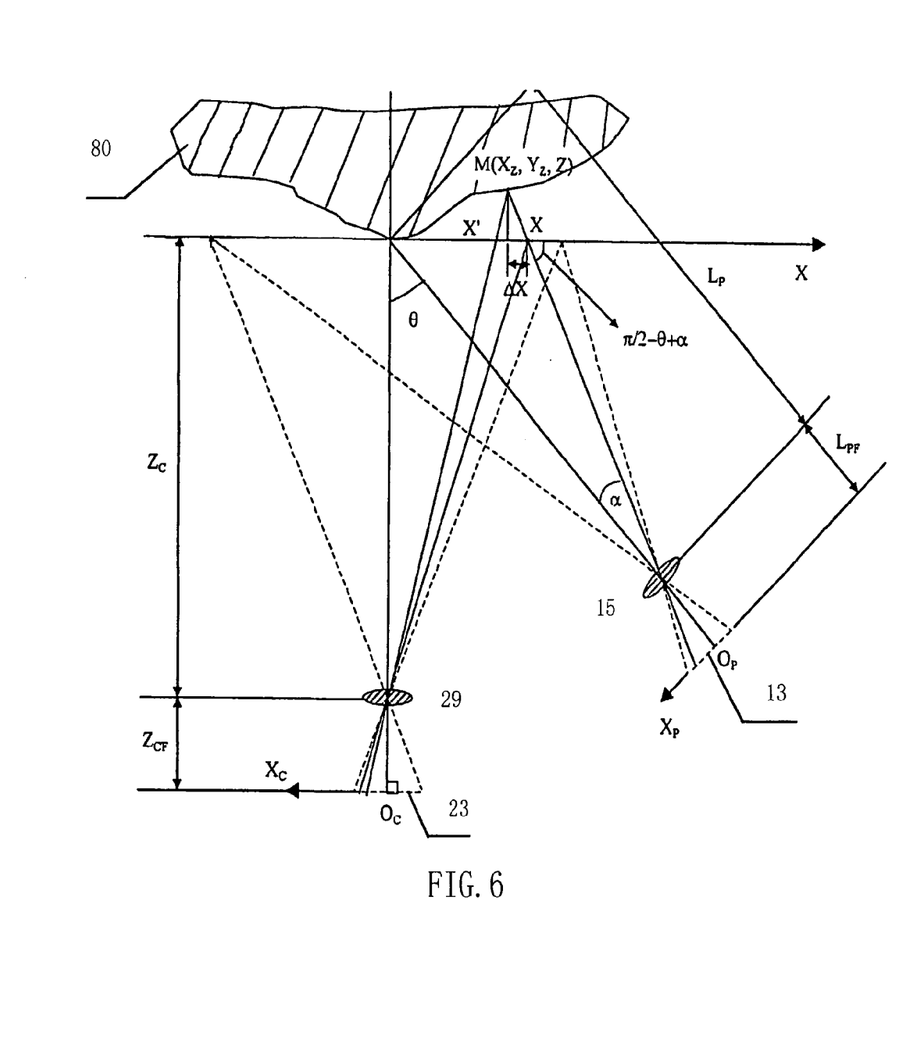
FIG. 6 is a schematic diagram to illustrate principles which are used in measurement of appearance of the object applying the moire fringes.

As illustrated in FIG. 6, a coordinate system is established on a plane defined by the projection grating, reference plane (where a surface point of the object is positioned) and reference grating (which is the submaster grating). In addition to define the projection grating space as $P_P$ (or the spatial frequency $f_P$) and the reference grating space as $P_C$ (or the spatial frequency $f_C$), an equation for the projection grating is:

$$I_P = \sin(2\pi f_P X_P) \qquad (11)$$

(assuming an initial phase to be zero, in addition, if non-sinusoidal functions are used in the equation of the projection grating, they can be converted into a combination of series of sinusoidal functions through the Fourier transformation. However, the first term of the Fourier series must be obtained so that the phase can be analyzed).

If X is correlated to $X_P$ on the reference plane, therefore $$tg\alpha = \frac{X_P}{L_{PF}} \qquad (12)$$

$$\frac{X}{\sin\alpha} = \frac{L_P}{\sin\left(\frac{\pi}{2} - \theta + \alpha\right)} = \frac{L_P}{\cos\theta\cos\alpha + \sin\theta\sin\alpha} \qquad (13)$$

which is, $X = \frac{L_P}{\cos\theta ctg\alpha + \sin\theta}$;

Accordingly, Equation 14 can be obtained from Equations (12) and (13):

$$X_P = \frac{X L_{PF}\cos\theta}{L_P - X\sin\theta} \qquad (14)$$

From the equations listed above, it is clear that there is a non-lineal relationship between $X_P$ and X, which leads to occurrence of distortion of the imaged grating which is projected on the reference plane. Therefore, the imaged grating will not be equal-spaced any more. An equation therefore can be expressed as follows for the imaged grating on the reference plane:

$$I = I_P = \sin\left(2\pi f_P \frac{X L_{PF}\cos\theta}{L_P - X\sin\theta}\right) \qquad (15)$$

If now considering the imaging system, an image of the projected grating is formed on the plane where the reference grating is located.

Referring to FIG. 6, it can find that $$\frac{X}{Z_C} = \frac{X_C}{Z_{CF}} \qquad (16)$$

so that:

$$X = \frac{Z_C}{Z_{CF}} X_C. \qquad (17)$$

Combining Equation (17) with Equation (15), an Equation (18) of the light intensity distribution can be obtained for the projected grating image which is formed at the reference grating plane:

$$I_C = \sin\left(2\pi f_P \frac{X_C Z_C L_{PF}\cos\theta}{Z_{CF} L_P - Z_C X_C \sin\theta}\right) \qquad (18)$$

If an equation for the reference grating is $I_{CR} = \sin(2\pi f_C X_C + \Delta)$ (19), then an Equation (20) for the mixed light intensity of the moire fringes formed by $I_C$ and $I_{CR}$ can be expressed as follows:

$$I_{CCD} = I_C \times I_{CR} \qquad (20)$$

$$= \sin\left(2\pi f_P \frac{X_C Z_C L_{PF}\cos\theta}{Z_{CF} L_P - Z_C X_C \sin\theta}\right) \times \sin(2\pi f_C X_C + \Delta)$$

$$= \frac{1}{2}\left\{\begin{array}{l}\cos\left[2\pi f_P \frac{X_C Z_C L_{PF}\cos\theta}{Z_{CF} L_P - Z_C X_C \sin\theta} - (2\pi f_C X_C + \Delta)\right] - \\ \cos\left[2\pi f_P \frac{X_C Z_C L_{PF}\cos\theta}{Z_{CF} L_P - Z_C X_C \sin\theta} + (2\pi f_C X_C + \Delta)\right]\end{array}\right\}$$

If applying the projected moire fringe interferometry to measure contour of the object surface, it requires that structure of the grating grooves cannot be recognized by a CCD camera according to the respective $I_C$ and $I_{CR}$. Thus, the second item of Equation (20) is related to effect of high frequencies, which correlates a uniform optical field so that it cannot be recognized by the CCD camera. However, the CCD camera can only recognize optical fields which correlate to moire fringes with low frequencies that are described in the first item of Equation (20). Therefore, Equation (20) can be simplified as follows:

$$I_{CCD} = \frac{1}{2}\cos\left[2\pi f_P \frac{X_C Z_C L_{PF}\cos\theta}{Z_{CF}L_P - Z_C X_C \sin\theta} - (2\pi f_C X_C + \Delta)\right] \quad (21)$$

where $f_P = f_C = f$ is generally agreed.

If the object is positioned behind the reference plane as illustrated in FIG. 6, and a point of the object which is selected serves as a reference point "0" (referring to a zero height of the point), the following Equations (22) and (23) can be obtained:

$$\frac{X'}{Z_C} = \frac{X - X' - \Delta X}{Z} = \frac{X - \Delta X}{Z + Z_C} = \frac{X_Z}{Z + Z_C} \quad (22)$$

$$X' = \frac{Z_C}{Z + Z_C}(X - \Delta X) \quad (23)$$

Referring to geometrical relationships in the FIG. 6, it shows:

$$\frac{Z}{\Delta X} = tg\left(\frac{\pi}{2} - \theta + \alpha\right), \text{ so that } \Delta X = Z\frac{1 - ctg\theta tg\alpha}{ctg\theta + tg\alpha}. \quad (24)$$

Equation 24 can be derived as:

$$\Delta X = Z\frac{\sin\theta - \cos\theta tg\alpha}{\cos\theta + \sin\theta tg\alpha}. \quad (25)$$

In addition, Equation (13) also can be expressed as:

$$X = \frac{L_P tg\alpha}{\cos\theta + \sin\theta tg\alpha} \quad (26)$$

Therefore, a simplified Equation (27) can be obtained by combining Equations (25), (26) and (12) with Equation (23):

$$X_P = L_{PF} \times \frac{X'(Z + Z_C)\cos\theta + ZZ_C \sin\theta}{Z_C L_P + ZZ_C \cos\theta - X'(Z + Z_C)\sin\theta} \quad (27)$$

Further combining $$X' = \frac{Z_C}{Z_{CF}} X_C$$

with Equation (27), an Equation (28) can be obtained:

$$X_P = L_{PF} \times \frac{Z_C X_C(Z + Z_C)\cos\theta + ZZ_C Z_{CF}\sin\theta}{Z_C Z_{CF}L_P + ZZ_C Z_{CF}\cos\theta - Z_C X_C(Z + Z_C)\sin\theta} \quad (28)$$

Light intensity distribution of projected grating image which is formed on the plane of the reference grating can be described as follows after it is modulated by the height attitude Z:

$$I_C = \sin\left(2\pi f_P \times \frac{Z_C X_C(Z + Z_C)\cos\theta + ZZ_C Z_{CF}\sin\theta}{Z_C Z_{CF}L_P + ZZ_C Z_{CF}\cos\theta - Z_C X_C(Z + Z_C)\sin\theta}\right) = \quad (29)$$

$$\sin\left(2\pi f_P \times L_{PF} \times \frac{Z\left(\begin{array}{c}Z_C Z_{CF}\sin\theta + \\ Z_C X_C\cos\theta\end{array}\right) + Z_C^2 X_C\cos\theta}{Z\left(\begin{array}{c}Z_C Z_{CF}\cos\theta - \\ Z_C X_C\sin\theta\end{array}\right) -} \\ Z_C^2 X_C\sin\theta + Z_C Z_{CF}L_P\right)$$

In addition, the grating equation can be rewritten as $$I_{CR} = \sin(2\pi f_C X_C + \Delta) \quad (9)$$

Then, if considering facts of $I_{CCD} = I_C \times I_{CR}$ and the high frequency grating structure which cannot be recognized, lead the following Equation (30):

$$I_{CCD} = \frac{1}{2}\cos\left[2\pi f_P L_{PF} \frac{Z(Z_C Z_{CF}\sin\theta + Z_C X_C\cos\theta) + Z_C^2 X_C\cos\theta}{Z(Z_C Z_{CF}\cos\theta - Z_C X_C\sin\theta) - Z_C^2 X_C\sin\theta + Z_C Z_{CF}L_P} - (2\pi f_C X_C + \Delta)\right] \quad (30)$$

Generally, $f_p = f_c = f$. If $Z = 0$, Equation (30) can be simplified to Equation (21), which also proves correctness of the above mathematical deduction.

In addition, the phase can be expressed as:

$$\varphi = 2\pi f_P L_{PF} \frac{ZA + B}{ZC + D} - (2\pi f_C X_C + \Delta) \quad (31)$$

where, $$A = Z_C Z_{CF} \sin\theta + Z_C X_C \cos\theta \quad B = Z_C^2 X_C \cos\theta$$

$$C = Z_C Z_{CF} \cos\theta - Z_C X_C \sin\theta \quad D = -Z_C^2 X_C \sin\theta + Z_C Z_{FL_P}$$

In terms of Equation (31), calculating the phase of the origin of the coordinates: $X_C = 0$, $Y_C = 0$, $Z = 0$, which are combined with Equation (21) to thereby obtain: $\phi_0 = -\Delta$. Here, $\phi_0$ can be eliminated since it is a constant which is added to all the phases. This means to treat all the phases as the following operation:

$$\phi = \phi - \phi_0 \quad (31\text{-}1);$$

therefore, a full-field phase can be obtained as:

$$\varphi = 2\pi f_P L_{PF} \frac{ZA+B}{ZC+D} - 2\pi f_C X_C \quad (32)$$

If applying $f_P=f_C=f$, Z can be expressed as:

$$Z = -\frac{\left(\frac{\varphi}{2\pi f} + X_C\right)D - L_{PF}B}{\left(\frac{\varphi}{2\pi f} + X_C\right)C - L_{PF}A} \quad (33)$$

Combining Equations (22) and (17) to thereby obtain Equation (34):

$$X_Z = \frac{Z+Z_C}{Z_C}X' = \frac{Z+Z_C}{Z_C} \cdot \frac{Z_C}{Z_{CF}}X_C = \frac{Z+Z_C}{Z_{CF}}X_C \quad (34)$$

In addition, since $Y_Z$ possesses the same proportional relationship as $X_Z$, thus $$Y_Z = \frac{Z+Z_C}{Z_{CF}}Y_C \quad (35)$$

Therefore, a group of completed equations for calculating the respective $X_Z$, $Y_Z$, Z can be finally obtained:

$$Z = -\frac{\left(\frac{\varphi}{2\pi f} + X_C\right)D - L_{PF}B}{\left(\frac{\varphi}{2\pi f} + X_C\right)C - L_{PF}A} \quad (36)$$

$$X_Z = \frac{Z+Z_C}{Z_{CF}}X_C$$

$$Y_Z = \frac{Z+Z_C}{Z_{CF}}Y_C$$

Applying the above equations, it is necessary to first operate a height conversion for solving the height distribution. Then perform a position transformation applying the last two equations of the equation group (36) to obtain $X_Z$ and $Y_Z$. Repeat the above illustrated procedures, an absolute contour of a full fielded 3D surface of the object can be constructed.

EXAMPLES

The following examples are provided for the purpose of illustration only and not limitation.

Example 1

Referring to FIG. 2, there is previously illustrated the imaging device 20, which is positioned on the marble table 90. The first rectilinearly movable axle 40 having a length of 1000 mm with a dust cover is also installed on the platform to align with the optical axis of the imaging device 20. The first axle 40 which is driven by a hand wheel is made from THK Cooperation, Japan. The object receiving platform 30 is rotatably in 360 degrees affixed to the movable plate which is slidably connected to the axle 40. An object 80, which is a blade of an aviation engine, is positioned on the platform 30. The first grating ruler 60 is installed in parallel with the axle 40. The second rectilinearly movable axle 50 having a length of 400 mm with a dust cover is also installed on the platform to be perpendicular to the first axle 40. The second axle 50 which is also driven by a hand wheel is made from THK Cooperation, Japan. The projection device 10 is affixed to a movable plate which is slidably affixed onto the second rectilinearly movable axle 50, where the optical axis of the projection device 10 intersects the second axle 50 at angle γ. The second grating ruler 70 is installed in parallel with the second axle 50.

As further illustrated, the projection device 10 connects to an electricity source 190 through an electrical wire C07. The measuring camera 21 and imaging camera 28 of the imaging device 20 through the respective cables C08 and C09 are connected to the Matrox Pulser image capture board 100 having four channels, wherein the board 100 is installed in the computer 110. All the linear positioners are from PI Cooperation, Germany, where the positioner 16 is of the model M224.20 for the projection lens of the projection device, the positioner 17 is of the model M222.20 for the master grating, and the positioner 29A is of the model M224.20 for the movable imaging lens of the imaging device. They are electrically connected to a direct current motor control board 180 (C-842.40) having four channels through the respective electrical cables C01, C02 and C03, wherein the control board is also installed in the computer 110.

The projection device 10 is illustrated in FIG. 3, comprising the light source 11 which is positioned in front of the condenser 12, the master grating 13 which is positioned in front of the mark point 14 having the cross shape, and the movable projection lens 15. The master grating 13 is movable aligning with an orientation of the grating surface, which movement is controlled by the linear positioner 17. The projection lens 15 is movable aligning with the optical axis of the projection device, whose movement is controlled by the linear positioner 16.

Referring to FIG. 4, the imaging device includes an alternative embodiment comprising the measuring light path 120 and imaging light path 130.

The imaging light path 130 includes the movable imaging lens 29, the linear positioner 29A which controls the movement of the movable imaging lens 29, the square prism 24 which is positioned between the image lens 29 and submaster grating 23, the mark point 25 which is positioned between the square prism 24 and the reflection mirror 26 which reflects an incident light at 90 degrees, and the imaging camera 28 having a camera lens 27 for recording the imaged mark point 25 having the cross shape.

The measuring optical path 120 includes the movable imaging lens 29, the linear positioner 29A which controls movement of the movable imaging lens 29 aligning with its optical axis, the submaster grating 23, the measuring camera 21 having a camera lens 22 for receiving images of the moire fringes positioned on the submaster grating 23.

During the measurement of the object, first adjust the linear positioner 16 of the projection device 10 to focus the movable projection lens 15, which forms a clear image of the mark point 14 of the cross on the object. Then adjust the linear positioned 29A to focus the movable imaging lens 29, which forms a clear image on the imaging camera 28 of the imaging device 20, wherein the image is the imaged mark point of the cross 14 positioned on the object. Then through additionally adjusting the second rectilinearly movable axle 50, make the image of the projected cross 14 on the object surface superpose upon the image of the cross 25 of the imaging device 20. In this situation, following steps of (2), (3) and (4) which are illustrated in FIG. 7, conduct the automatically focusing, which is to focus the projection lens through operation of the linear positioned 16, so that the grooves of the master grating are clearly imaged on the subject surface. Then through a fine operation of the linear positioner 29A, make the imaging lens 29 which is finely focused form a clear image on the camera of the imaged grooves which are projected on the object surface. Under this condition, conduct operation following steps of (5), (6), (7) and (8) which are illustrated in FIG. 7, wherein the operation includes moving the master grating of the projection device in the direction which is vertical to the optical axis of the projection device according to a moved distance of a respective quarter, half and three-quarter grating space, so that a total of four graphs of the moire fringes can be obtained.

Then input the moire fringes recorded on the measuring camera into the image capture board 100, which results in inputting the digitized moire fringed into the computer 110. Accordingly, diagrams of the digitized fringes are obtained. Then apply the phase-shift algorithm to calculate a phase diagram ranging from 0 to $2\pi$. Finally, reference the zero phase of the mark point and the equations, calculate the height distribution of one position of the subject surface, and repeatedly these procedures, obtain $X_Z, Y_Z$ and Z of ever point of the object surface to thereby acquire accurate contour of the full fielded 3D surface of the object. It will be appreciated that an accuracy can be ±0.01 mm applying the present invention apparatus and method.

Example 2

Referring to FIG. 2, there is previously illustrated the imaging device 20 (see FIG. 9), which is positioned on the marble table 90. The first rectilinearly movable axle 40 having a length of 1000 mm with a dust cover is also installed on the platform to align with the optical axis of the imaging device 20. The first axle 40 which is driven by a hand wheel is made from THK Cooperation, Japan. The object receiving platform 30 is rotatably in 360 degrees affixed to the movable plate which is slidably connected to the axle 40. An object 80, which is a blade of an aviation engine, is positioned on the platform 30. The first grating ruler 60 is installed in parallel with the axle 40. The second rectilinearly movable axle 50 having a length of 400 mm with a dust cover is also installed on the platform to be perpendicular to the first axle 40. The second axle 50 which is also driven by a hand wheel is made from THK Cooperation, Japan. The projection device 10 is affixed to a movable plate which is slidably affixed onto the second rectilinearly movable axle 50, where the optical axis of the projection device 10 intersects the second axle 50 at angle γ. The second grating ruler 70 is installed in parallel with the second axle 50.

As further illustrated, the projection device 10 connects to an electricity source 190 through the electrical wire C07. The measuring camera 21 and imaging camera 28 of the imaging device 20 through the respective cables C08 and C09 are connected to the Matrox Pulser image capture board 100 having four channels, wherein the board 100 is installed in the computer 110. All the linear positioners are from PI Cooperation, Germany, where the positioner 16 is of the model M224.20 for the projection lens of the projection device, the positioner 17 is of the model M222.20 for the master grating, and the positioner 29A is of the model M224.20 for the movable imaging lens of the imaging device. They are electrically connected to a direct current motor control board 180 (C-842.400) having four channels from PI Cooperation, Germany through the respective electrical cables C01, C02 and C03, wherein the control board is also installed in the computer 110.

The projection device 10 is illustrated in FIG. 8, comprising the light source 11, the condenser 12, a round mark point 14, the master grating 13 whose movement is controlled by the grating linear positioner 17, a switcher 18 for switching the mark point and master grating, and the movable projection lens 15 with the linear positioner 16.

The imaging device 20 is illustrated in FIG. 9, comprising the measuring camera 21 with the camera lens 22, the switcher 27 for the submaster grating 23 and round mark point 25, and the movable imaging lens 29 with a linear positioner 29A.

During the measurement of the object, first switch the round mark point 13 into the projecting light path. Then adjust the linear positioner 16 of the projection device 10 to focus the movable projection lens 15, which makes a clear image of the round mark point on the object. Then switch the round mark point 25 of the imaging device 20 into the imaging light path. Adjust the linear positioned 29A to focus the movable imaging lens 29 and adjust the length of the second rectilinearly movable axle 50, which makes an image of the projected round mark point 13 on the object surface superpose upon the image of the round mark point 25 of the imaging device 20 on the measuring camera 21. In this situation, perform steps of (2), (3) and (4) which are illustrated in FIG. 7, and then conduct automatically focusing, which is, switch the master grating 13 into the projecting light path, and switch the submaster grating 23 into the imaging light path. Under this condition, conduct operation following steps of (5), (6), (7) and (8) which are illustrated in FIG. 7, an accurate contour of the full field 3D surface of the object can be obtained with an accuracy of ±0.01 mm. Additional procedures can be seen in EXAMPLE 1.

The present invention method and apparatus for measuring contour of the 3D object surface applying the moire fringes includes: applying a method and apparatus of the projected moire interferometry to form graphs of the moire fringes containing information related to a height distribution of surface points of the measured objects; inputting data of light intensities of the optical images which are recorded by the camera into a computer through application of the image capture board; digitizing the graphs of the moire fringes as a pre-data processing of the computation; analyzing a plurality of the moire fringe graphs applying unwrapping algorithm after the graphs have been first treated by the phase shift algorithm; and obtaining phase diagrams containing digitized height information of the measured object surface and values of the X, Y and Z coordinates of every surface point to thereby complete measurement of the absolute contour of the 3D surface, which illustrates a dynamic 3D surface of the measured objects and provides data of the measured surface.

The present invention accomplishes measuring the absolute contour of full fielded 3D surface of objects. The accuracy is ±0.01 mm from the present invention, which are 10-15 folds better, as compared with the currently available commercial instrument. In addition, the measurement can be completed with 30 seconds applying the present invention method and apparatus. Therefore, the method and apparatus which possess a high accuracy and speed is particularly useful for measuring objects having sophisticated 3D surface such as the engines.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The invention claimed is:

1. An apparatus for measuring a contour of an object, comprising:
   a. a projection device having a projecting optical axis comprised of a light source, a movable projection lens, a first grating having a plurality of grating grooves and a first mark point;
   b. an imaging device having an imaging optical axis comprised of a movable imaging lens, a second grating including multiple grooves, a second mark point and a first camera;
   c. a first rectilinearly movable axle which is positioned perpendicular to a second rectilinearly movable axle, wherein said object is rotatably and movably positioned on said first rectilinearly movable axle which is aligned with said imaging optical axis of said imaging device, said projection device is movably positioned on said second rectilinearly movable axle;
   d. means for adjusting positions of the respective projection device and object to construct an initial right angled triangle from connecting said first mark point of said projection device, said second mark point of said imaging device and an image of said first mark point of said projection device which is projected onto said object;
   e. means for further adjusting positions of the respective projection device and object to construct a subsequent right angled triangle from connecting said first mark point of said projection device, said second mark point of said imaging device and an image of said first mark point of said projection device which is projected onto said object, means for obtaining data of said subsequent right angled triangle including the projected object and image distances and the imaged object and imaged distances;
   f. means for automatically refocusing said projection lens and imaging lens which results in obtaining four sequential graphs of moire fringes;
   g. means for calculating a phase diagram according to said graphs containing said moire fringes;
   h. means for calculating phase data of surface points of said object according to a zero phase which is defined for said image of said first mark point which is projected on said object; and
   i. means for calculating altitude distribution of said surface points of said object to thereby obtain an absolute full field three dimensional contour of said object with a high accuracy.

2. The apparatus as claimed in claim 1, further comprising first and second grating rulers which are positioned in parallel with the respective first and second rectilinearly movable axles.

3. The apparatus as claimed in claim 1, further comprising a first rotating plate which is movably and rotatably positioned on said first rectilinearly movable axle, wherein said object is positioned onto said first rotating plate, and said projecting optical axis of said projection device intersects said first rectilinearly movable axle at an angle.

4. The apparatus as claimed in claim 1, wherein said first mark point is positioned on one side of said first grating of said projection device as compared with said grooves which are positioned on the opposite side of said first grating.

5. The apparatus as claimed in claim 1, further comprising that said first mark point is positioned in parallel with said grooves of said first grating which is positioned in reference to said projecting optical axis.

6. The apparatus as claimed in claim 5, further comprising a first switcher which can switch the respective grating having said grooves and said first market point alternatively respectively in or off said projecting optical axis of said projection device.

7. The apparatus as claimed in claim 1, further comprising a linear grating positioner in said projection device which can sequentially move said first grating along an orientation of said grating sides according to a predetermined distance including the respective quarter, a half, and a three quarter of a grating space.

8. The apparatus as claimed in claim 1, wherein said second mark point is positioned in parallel with said multiple grooves of said second grating which is positioned in reference to said projecting optical axis.

9. The apparatus as claimed in claim 8, further comprising a second switcher which can switch said second grating having said multiple grooves and said second mark point alternatively respectively in or off said imaging optical axis of said imaging device.

10. The apparatus as claimed in claim 1, wherein a type of said first and second gratings includes a Ronchi grating or sinusoidal grating.

11. The apparatus as claimed in claim 1, wherein said first and second mark points are in either a cross or a round shape.

12. The apparatus as claimed in claim 1, further comprising a first and second linear positioners for moving the respective projection lens and imaging lens along the respective optical axe.

13. The apparatus as claimed in claim 1, wherein said imaging device is further comprised of an imaging light path and a measuring light path, said measuring light path comprising said movable imaging lens with said second linear positioner, said second grating, and a measuring camera having a camera lens, said imaging light path comprising said movable imaging lens with said second linear positioner, a square prism, said second mark point, a reflection mirror, an imaging camera having an imaging lens.

14. The apparatus as claimed in claim 1, wherein said light source includes a white light.

15. The apparatus as claimed in claim 1, further comprising an image capture board and a computer which installs said board for imaging processing.

16. An apparatus for measuring a contour of an object, comprising:
   a. a projection device having a projecting optical axis comprising a light source, a movable projection lens, a first grating and a first mark point;
   b. an imaging device having an imaging optical axis comprising a movable imaging lens, a second grating, a second mark point and a first camera;
   c. a first rectilinearly movable axle which is positioned perpendicular to a second rectilinearly movable axle, wherein said object is rotatably and movably positioned on said first rectilinearly movable axle which is aligned with said imaging optical axis of said imaging device, said projection device is movably positioned on said second rectilinearly movable axle wherein the projecting optical axis intersects said first rectilinearly movable axle at an angle; and
   d. means for sequentially adjusting positions of the respective projection device and object to construct sequential right angled triangles from connecting the respective first mark point of said projection device, the second mark point of said imaging device and an image of said first mark point of said projection device which is projected onto said object to thereby obtain sequential graphs of moire fringes for an absolute full fielded three dimensional contour of said object with a high accuracy.

17. A method for measuring a contour of an object, comprising steps of:
   a. providing a projection device having a projecting optical axis comprised of a light source, a movable projection lens, a first grating having a plurality of grating grooves and a first mark point;
   b. providing an imaging device having an imaging optical axis comprised of a movable imaging lens, a second grating including multiple grooves, a second mark point and a first camera;
   c. providing a first rectilinearly movable axle which is positioned perpendicular to a second rectilinearly movable axle, wherein said object is rotatably and movably positioned on said first rectilinearly movable axle which is aligned with said imaging optical axis of said imaging device, said projection device is movably positioned on said second rectilinearly movable axle;
   d. adjusting positions of the respective projection device and object to construct an initial right angled triangle ABC by connecting said first mark point of said projection device, said second mark point of said imaging device and an image of said first mark point of said projection device which is projected onto said object;
   e. further adjusting positions of the respective projection device and object to construct a subsequent right angled triangle ADE by connecting said first mark point of said projection device, said second mark point of said imaging device and an image of said first mark point of said projection device which is projected onto said object, means for obtaining data of said subsequent right angled triangle including projected object and image distances and imaged object and imaged distances;
   f. automatically refocusing said projection lens and imaging lens which results in obtaining four sequential graphs of moire fringes;
   g. calculating a phase diagram according to said graphs containing said moire fringes;
   h. determining phase data of surface points of said object according to a zero phase which is defined for said image of said first mark point which is projected on said object; and
   i. calculating altitude distribution of said surface points of said object to thereby obtain an absolute full fielded three dimensional contour of said object with a high accuracy.

18. The method as claimed in claim 17, wherein constructing said initial right angled triangle ABC is further comprised of steps of:
   a. moving said object along said first rectilinearly movable axle to a position "C" mostly close said imaging device;
   b. focusing said projection lens to thereby form an image of said first mark point of said projection device on a surface of said object;
   c. focusing said imaging lens to thereby form an image of said object including said imaged first mark point on said object;
   d. moving said projection device along said second rectilinearly movable axle to thereby superpose said image of said imaged first mark point upon said second mark point of said imaging device; and
   e. obtaining data of said initial right angled triangle ABC including an angle θ which is formed by intersecting said optical axis of said projection device and said optical axis of said imaging device, a length of a line AB which is a distance between said first mark point at a position B and said second mark point at a position A, and said length of said line AB determined from including a reading of a second grating ruler which is positioned in parallel with said second rectilinearly movable axle.

19. The method as claimed in claim 18, wherein constructing said subsequent right angled triangle is further comprised of the steps of:
   a. moving said projection device with a distance $R_2$ to a position D along said second rectilinearly movable axle, wherein a value of $R_2$ which is equal to a length of a line BD can be obtained from a reading of said second grating ruler;
   b. moving said object with a distance $R_1$ to a position E along said first rectilinearly movable axle, wherein a value of $R_1$ which equals a length of a line CE can be obtained by reading a first grating ruler which is positioned in parallel with said first rectilinearly movable axle; and
   c. determining a projected object distance as $L_P$, a project image distance as $L_{PF}$, an imaged object distance as $Z_C$, and an imaged image distance as $Z_{CF}$ applying following Equations [1-5]:

$$AD = AB + R_2 \quad [1]$$

$$1/Z_C + 1/Z_{CF} = 1/F_1 \quad [2]$$

$$Z_C + Z_{CF} = AD/tg\,\theta \quad [3]$$

$$L_P + L_{PF} = AD/\sin\theta \quad [4]$$

$$1/L_P + 1/L_{PF} = 1/F_2 \quad [5]$$

wherein $\theta = \text{arc tg } R_2/R_1$, $F_1$ and $F_2$ are focal lengths of the respective projection lens and imaging lens.

20. The method as claimed in claim 19, wherein said step of automatically refocusing is further comprised of the steps of:
   a. moving said projection lens along said projecting optical axis to a position which correlates to said project image distance $L_{PF}$;
   b. moving said imaging lens along said imaging optical axis to a position which correlates to said project image distance $Z_{CF}$;
   c. recording a first graph of moire fringes which are positioned on said second grating of said imaging device from applying said imaging camera; and
   d. moving said first grating along an orientation of its grating surface according to a moving distance of a respective quarter, half and three-quarter grating space to thereby obtain additional three graphs of moire fringes.

21. The method as claimed in claim 17, wherein said step of calculating a phase diagram is further comprised of applying the following Equations [6-10]:

$$I_1 = I_0 + A \sin(\phi + 0) \quad [6]$$

$$I_2 = I_0 + A \sin(\phi + \pi 1/2) \quad [7]$$

$$I_3 = I_0 + A \sin(\phi + \pi) \quad [8]$$

$$I_4 = I_0 + A \sin(\phi + \pi 3/2) \quad [9]$$

$$\phi = \text{arc } tg(I_4 - I_2)/(I_1 - I_3) \quad [10]$$

where $\phi$ is a phase of a measured surface point of said object, $I_0$ is an intensity of background lights, and A is a constant of said moire fringes.

22. The method as claimed in claim 17, wherein said calculating phase data is further comprised of applying the principles of:

$$\phi_2=\phi_1-2\pi \text{ if } \phi_2-\phi_1 \geq \pi, \text{ and } \phi_2=\phi_1+2\pi \text{ if } \phi_2-\phi_1 \leq -\pi.$$

23. The method as claimed in claim 17, wherein said calculating altitude distribution of surface points of said object is further comprised of applying a group of equations:

$$Z=\{(\phi/2\pi f+X_C)D-L_{PF}B\}/\{(\phi/2\pi f+X_C)D-L_{PF}A\};$$

$$X_Z=X_C(Z+Z_C)/Z_{CF}; \text{ and}$$

$$Y_Z=Y_C(Z+Z_C)/Z_{CF}$$

where $X_Z$, $Y_Z$ and Z are three dimensional coordinates of respective surface points of said object, and factors of A, B, C and D can be obtained from the respective equations:

$$A=Z_C Z_{CF} \sin\theta + Z_C Z_{CF} \cos\theta;$$

$$B=Z^2_C X_C \cos\theta;$$

$$C=Z_C Z_{CF} \cos\theta - Z_C Z_{CF} \sin\theta; \text{ and}$$

$$D=-Z^2_C X_C \sin\theta + Z_C Z_{CF} L_P.$$

24. A method for measuring contour of an object, comprising steps of:
  a. providing a projection device having a projecting optical axis comprising a light source, a movable projection lens, a first grating and a first mark point;
  b. providing an imaging device having an imaging optical axis comprising a movable imaging lens, a second grating, a second mark point and a first camera;
  c. providing a first rectilinearly movable axle which is positioned perpendicular to a second rectilinearly movable axle, wherein said object is rotatably and movably positioned on said first rectilinearly movable axle which is aligned with said imaging optical axis of said imaging device, said projection device is movably positioned on said second rectilinearly movable axle whose said optical axis intersects said first rectilinearly movable axle at an angle;
  d. sequentially adjusting positions of the respective projection device and object to construct sequential right angled triangles from connecting the respective said first mark point of said projection device, said second mark point of said imaging device and an image of said first mark point of said projection device which is projected onto said object to thereby obtain sequential graphs of moire fringes for an absolute full field three dimensional contour of said object with a high accuracy.

* * * * *